(12) United States Patent
Barozzi et al.

(10) Patent No.: US 7,542,674 B1
(45) Date of Patent: Jun. 2, 2009

(54) OPTICAL LINK PERFORMANCE MONITORING

(75) Inventors: Gianpaolo Barozzi, Milan (IT); Mauro Macchi, Gorla Maggiore (IT); Andrea Marchio, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 750 days.

(21) Appl. No.: 09/865,295

(22) Filed: May 24, 2001

(51) Int. Cl.
    *H04B 10/08* (2006.01)
(52) U.S. Cl. .............................. 398/33; 398/16; 398/20
(58) Field of Classification Search .................. 398/10, 398/13, 14, 17, 20, 30–33, 177, 174, 181, 398/16
    See application file for complete search history.

(56) References Cited

U.S. PATENT DOCUMENTS

| | | | | |
|---|---|---|---|---|
| 5,436,750 A * | 7/1995 | Kawano | ........................ | 398/10 |
| 5,715,076 A * | 2/1998 | Alexander et al. | ............. | 398/87 |
| 5,793,909 A | 8/1998 | Leone et al. | .................. | 385/24 |
| 5,914,794 A * | 6/1999 | Fee et al. | ........................ | 398/20 |
| 6,204,959 B1 * | 3/2001 | Fujita et al. | ............... | 359/337.2 |
| 6,515,967 B1 * | 2/2003 | Wei et al. | ...................... | 370/244 |
| 6,570,686 B1 * | 5/2003 | Kim | ............................. | 398/79 |
| 6,690,884 B1 * | 2/2004 | Kelty et al. | .................... | 398/27 |
| 6,785,473 B1 * | 8/2004 | Sasaki et al. | ................... | 398/79 |
| 6,928,243 B2 * | 8/2005 | Youn et al. | .................... | 398/33 |
| 2002/0138796 A1 * | 9/2002 | Jacob | ......................... | 714/712 |
| 2003/0210908 A1 * | 11/2003 | Levy et al. | .................... | 398/33 |

FOREIGN PATENT DOCUMENTS

| WO | 98/32023 | 7/1998 |
|---|---|---|
| WO | 01/28133 | 4/2001 |

* cited by examiner

*Primary Examiner*—Dalzid Singh

(57) ABSTRACT

Systems and methods for verifying performance at an intermediate point in an optical link are provided by virtue of one embodiment of the present invention. One application is locating a fault along a long optical link while minimizing the need for trained personnel to inspect and monitor the link at numerous widely separated locations. At an intermediate point in the link, a portion of the optical signal present is tapped off and demodulated. By use of error correction decoding techniques on the demodulated data, the performance of the link up until that intermediate point may be verified.

4 Claims, 4 Drawing Sheets

OPTICAL LINK PERFORMANCE MONITORING

BACKGROUND OF THE INVENTION

The present invention relates to optical communication systems, and more particularly to systems and methods for monitoring performance of optical communication links.

Increasingly, very high data long distance rate communication links are being implemented using purely optical technology where optical signals are passed over very long distances without the need to recover data and regenerate the optical signal. Such implementations include so-called long haul (LH) systems where optical signals travel on the order of 500 km without regeneration and even ultra-long haul (ULH) where optical signals travel more than 2000 km without regeneration. Further augmenting the data carrying capability and general utility of such optical systems is the use of wave division multiplexing (WDM) and dense wave division multiplexing (DWDM) techniques where multiple signals with different wavelengths share the same fiber.

Reliability in such long haul and ultra long haul optical communication links is imperative. The links carry a very heavy volume of data serving numerous subscribers. Any failure will disrupt their data communications and furthermore potentially impact the revenue of the service provider operating the link. Failure of the described communication link can occur due to, e.g., accidental cutting of the line due to carelessness in digging, impairment of the performance of an intermediate optical amplifier, etc. When such a link is down for any reason, it is very important to locate the fault as quickly as possible so that service may be restored. However, simply monitoring the output of a long haul or ultra long haul link is insufficient to locate the fault along the all-optical route. The fault could be anywhere along hundreds or even thousands of kilometers of optical fiber. Sending trained personnel and appropriate test equipment to make measurements along such a long link is extremely expensive and time consuming.

What is needed are systems and methods for rapidly and conveniently locating transmission faults in long haul and ultra long haul optical communication systems.

SUMMARY OF THE INVENTION

Systems and methods for verifying performance at an intermediate point in an optical link are provided by virtue of one embodiment of the present invention. One application is locating a fault along a long optical link while minimizing the need for trained personnel to inspect and monitor the link at numerous widely separated locations. At an intermediate point in the link, a portion of the optical signal present is tapped off and demodulated. By use of error correction decoding techniques on the demodulated data, the performance of the link up until that intermediate point may be verified.

According to a first aspect of the present invention, a method for monitoring performance of an optical communication link includes: at a first intermediate location along the link, separating a portion of an optical signal traveling along the link to form a first measurement optical signal, detecting the measurement optical signal to form a measurement electrical signal, and performing error correction decoding on the measurement electrical signal to generate an indication of correct receipt of data at the first intermediate location.

A second aspect of the present invention provides a system for locating a fault along an optical communication link. The system includes: a first link monitor that monitors performance of the link at a first intermediate location along the link, a second link monitor that monitors performance of the link at second intermediate location along the link. The first link monitor and the second link monitor each include: a coupler that separates a portion of an optical signal traveling along the link, an optical receiver that recovers data based on the portion of the optical signal, an error correction decoding circuit that identifies errors in receipt of the data, and a link verification stage that generates an indication of link operation based on the errors detected by the error correction decoding circuit.

Further understanding of the nature and advantages of the inventions herein may be realized by reference to the remaining portions of the specification and the attached drawings.

DESCRIPTION OF SPECIFIC EMBODIMENTS

The present invention will now be described with reference to a long haul or ultra-long haul optical link wherein multiple optical monitors are installed to locate faults. It will be appreciated, however, that this is merely a representative application and that the invention will find application in many other contexts.

Figure 1:
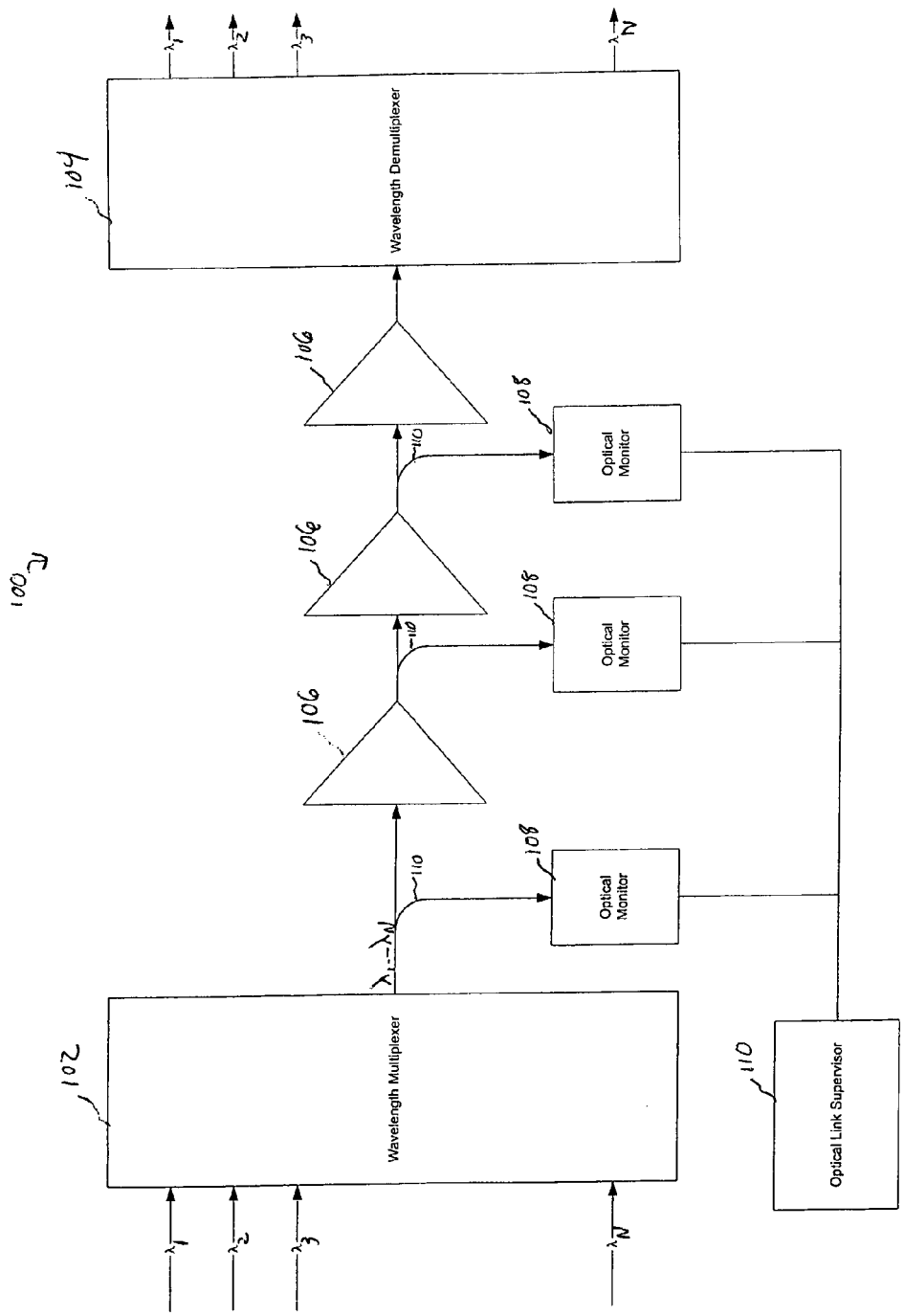
FIG. 1 depicts a WDM optical communication link equipped with special monitoring features according to one embodiment of the present invention.

FIG. 1 depicts a wavelength division multiplexed (WDM) optical communication link 100. FIG. 1 depicts a one-way communication link (uni-directional) although it will of course be appreciated that two-way communication (bi-directional) can be provided by combining two such links operating in opposite directions.

At the transmit end, a wavelength multiplexer 102 combines multiple signals having disparate wavelengths and arriving on different inputs. Various structures of wavelength multiplexer 102 are known in the art and wavelength multiplexer 102 may be implemented using any suitable technique. The output of wavelength multiplexer 102 is a single fiber that carries all of the input optical signals. At the receive end, a wavelength demultiplexer 104 receives the combined multi-wavelength signal and separates out the various wavelengths components for output on individual fibers. Wavelength demultiplexer 104 also may be implemented using any suitable technique as known in the art. At the transmit and receive ends, there is other hardware such as photodetectors, lasers, demodulators, modulators, etc. to handle conversion between optical signals and electrical signals. These components are not shown.

There is no regeneration of the optical signal between wavelength multiplexer 102 and wavelength demultiplexer 104. There may, however, be multiple optical amplifiers 106 to boost the optical signal. These may be erbium doped fiber amplifiers (EDFAs), Raman amplifiers, or any other suitable optical amplifier as known in the art. For ease of depiction, three amplifiers 106 are shown but there may be fewer amplifiers or many more depending on system requirements.

Wavelength multiplexer 102 and wavelength demultiplexer 104 may be separated by a great distance. The optical signal may thus traverse hundreds or even thousands of kilometers without electrical regeneration. According to the present invention, performance of the optical link may be monitored at intermediate points even though the signals are not otherwise available in electrical form. Accordingly, there are a plurality of optical monitors 108 placed at various intermediate points. They may be placed at any points along the link. The more monitors 108 that are employed at closer spacings, the easier it will be to localize faults while minimizing search time and expense.

To feed each optical monitor 108, there is a corresponding tap coupler 110. Tap coupler 110 is a 10/90 tap coupler and splits off 10% of the optical signal power for monitoring purposes. Each optical monitor 108 evaluates the performance of the optical link from the transmit end to the connection point of its tap coupler.

Each optical monitor reports its measurements back to an optical link supervisor 110 which may be located at the transmit end, the receiver end or at any other convenient point. Optical monitors 108 are capable of testing the performance of the link for individual wavelengths. In one embodiment, optical monitors 108 act under the supervision of optical link supervisor 110 and test particular wavelengths at times designated by optical link supervisor 110. Communication between optical link supervisor 110 and optical monitors 108 may be by any means. For example, if the optical monitors are at very isolated sites, it may be convenient to use satellite wireless communication. A system optical service channel may be exploited to transfer information via the monitored optical fiber itself. Alternatively, one or more optical monitors 108 may be fitted with a conventional telephone modem and connected to the public switch telephone network.

A variety of higher layer protocols may be employed for communication between optical monitors 108 and optical link supervisor 110. Optical monitors 108 may include hardware and software necessary to implement simple web servers such that optical link supervisor 110 may give commands and receive performance monitoring information back by the use of simple HTTP commands. Such web servers of optical monitors 108 may participate in a virtual private network such that service provider personnel may query network performance from anywhere that they have access to the same virtual private network.

Figure 2:
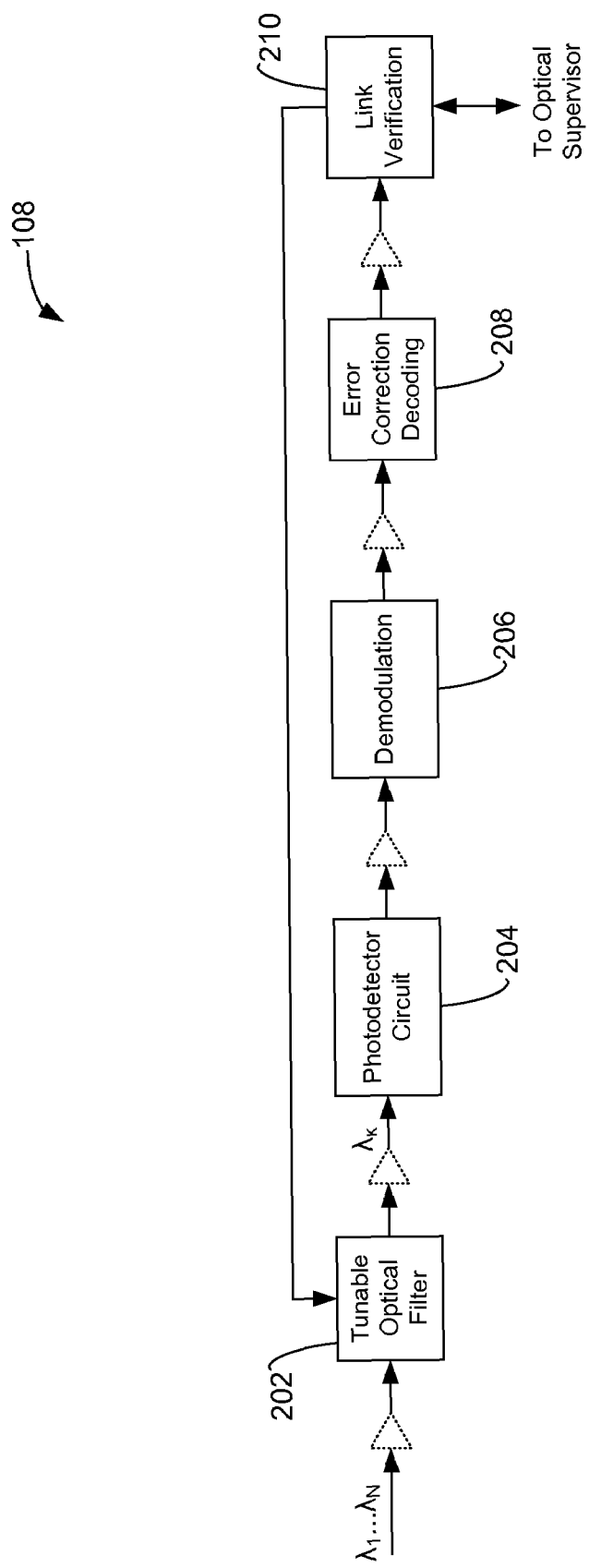
FIG. 2 depicts an optical monitor according to one embodiment of the present invention.

FIG. 2 depicts details of a representative optical monitor 108 according to one embodiment of the present invention. A signal from a corresponding tap coupler 110 is input to a tunable optical filter 202. The input signal to tunable optical filter 202 is a WDM signal that includes components having different wavelengths. As indicated by the amplifier symbols in dotted lines, an additional optical amplifier can be inserted either at the input or output of tunable optical filter 202 as required. Tunable optical filter 202 selects a particular wavelength for further processing by optical monitor 108. Tunable optical filter 202 may be implemented as a Fabry-Perot filter, a Mach-Zehnder interferometer, tunable Bragg grating etc. The output of tunable optical filter 202 is a single wavelength signal.

The output signal of tunable optical filter 202 is passed to a photodetector circuit 204 as known in the art. Photodetector circuit 204 converts the input optical signal to an electrical signal. Photodetector circuit 204 typically employs a photodiode and an amplifier circuit. Photodetector circuit 204 may be implemented in any suitable manner. A demodulation circuit 206 recovers clock information and digital data from the analog signal output by photodetector circuit 204. Demodulation circuit 206 may be implemented in any suitable way. Photodetector circuit 204 and demodulation circuit 206 may be understood as together representing an optical receiver.

Typically, in optical communication systems a forward error correction (FEC) coding scheme is employed that allows the original data to be recovered even if certain bits have been corrupted by noise and interference. FEC techniques add a certain amount of redundancy to the transmitted data and exploit this redundancy to provide error-free communication even under noisy conditions. A by-product of the error correction decoding process for certain codes is that errors are detected and may be counted. In some situations, errors may be detected even when they cannot be corrected by the operation of the decoding scheme.

An error correction decoding block 208 decodes in accordance with the encoding scheme used on that particular link. For example, error correction decoding block 208 may perform Reed-Salomon decoding or whatever decoding scheme is appropriate. Because the traffic traveling along optical communication link 100 may have multiple sources employing multiple encoding schemes, it is desirable that error correction decoding block 208 have the capability of detecting which encoding scheme has been used and decoding accordingly. In this application, the objective of error correction decoding block 208 is not to recover the data but rather to count errors detected during the decoding process. It is not necessary for error correction decoding block 208 to output decoded data.

Based on the output of error correction decoding block 208, a link verification block 210 computes a bit error rate, i.e., the number of errors divided by the number of =transmitted data bits. This bit error rate may be transmitted directly to optical link supervisor 110. Alternatively, link verification block 210 may compare the bit error rate to a threshold and evaluate itself whether or not the link is performing based on whether the bit error rate exceeds a threshold, e.g. $1 \times 10^{-8}$. Another criterion may be a comparison of the current instantaneous measurement with historical data. Bit error rate is but one example of an indication of link operation that may be developed by link verification block 210 based on the output of error correction decoding block 208.

Link verification block 210 is also capable of controlling which wavelength signal is monitored at any one time by adjusting the center frequency of tunable optical filter 202. In one embodiment, link verification block 210 further includes functionality for external access to performance monitoring information. For example, link verification block 210 may incorporate HTTP communication facilities so that web access may be used to retrieve performance information for particular wavelengths. Link verification block 210 may also incorporate physical layer hardware such as modems, wireless transceivers, etc. to facilitate communication with optical link supervisor 110 or other optical monitoring entities.

Figure 3:
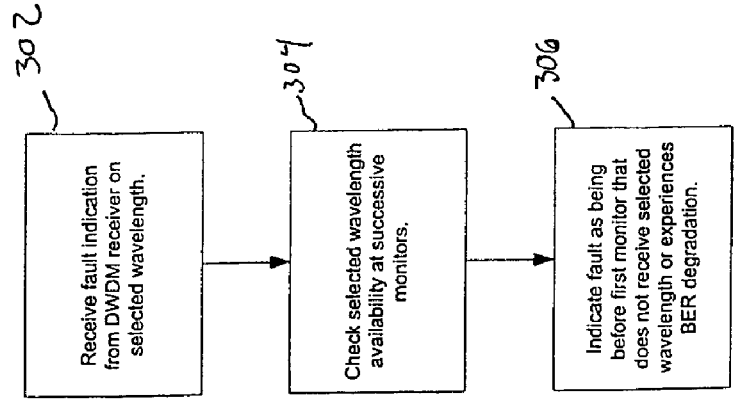
FIG. 3 is a flowchart describing steps of locating a fault according to one embodiment of the present invention.

FIG. 3 is a flowchart describing steps of operating optical link supervisor 110 to locate a fault along link 100 according to one embodiment of the present invention. The process depicted in FIG. 3 begins with a step 302 where the receive end of the WDM link indicates a fault on a selected wavelength. For example, the signal may be absent or there may be an excess of bit errors. Optical link supervisor 110 responds by directing the optical monitors 108 to check the selected wavelength having the fault by switching their tunable filters to that selected wavelength and to monitor for bit errors there. Optical monitors 108 determine the bit error rate at each monitored point along the link and report these rates back to optical link supervisor 110. Now at step 306, optical link supervisor 110 may develop a refined estimate as to the location of the fault. Generally speaking, the fault will be determined to be after the last optical monitor 108 that experiences an acceptable bit error rate and before the first optical monitor 108 that experiences an excessive bit error rate or no connection. With this knowledge, service provider personnel can concentrate further investigation on a particular section of the link.

It will be appreciated that in this way many types of faults may be located. For example, if the gain of one of amplifiers 106 begins to tilt such that one or more wavelengths are degraded, identifying which amplifier may be exhibiting such a failure condition will be made much easier by the systems and methods that have just been described. Of course, a line break may result in a total loss of signal on all wavelengths and this also may be more readily located according to the present invention.

Figure 4:
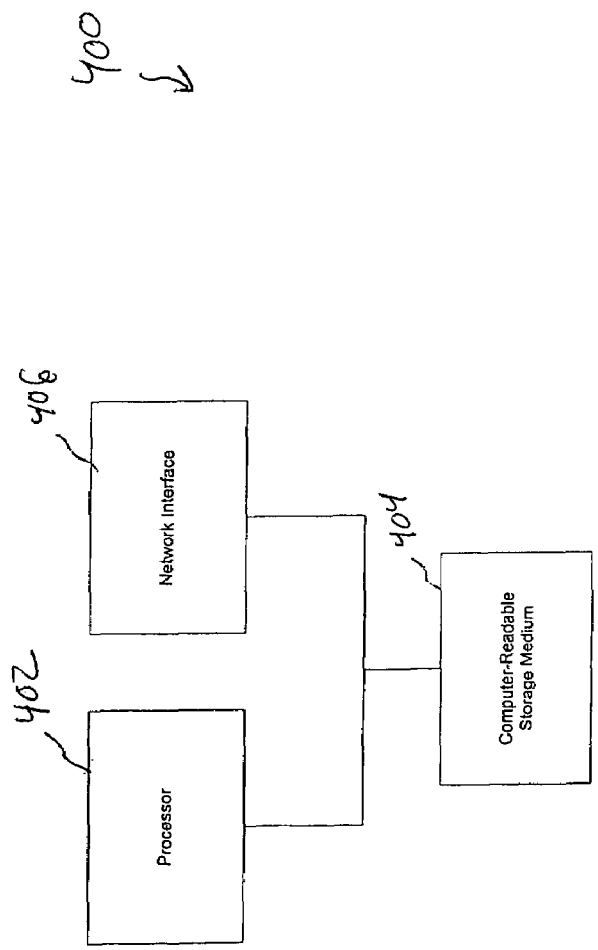
FIG. 4 depicts a computer that may be used to implement an optical supervisor according to one embodiment of the present invention

Implementing optical link supervisor 110, error correction decoding circuit 208, or link verification block 210 may involve the use of a computer system operating under the control of software. Accordingly, FIG. 4 is a simplified representation of a computer system 400 that may be used to implement elements of the present invention. A processor 402 is depicted and represents any computational hardware usable to execute instructions to implement the present invention or functionality related to the present invention. Processor 402 may be a single CPU as known in the art.

Processor 402 executes instructions or code that are stored on a computer-readable storage medium 404. Computer readable storage medium 404 may be, e.g., any type of hard disk drive, optical storage medium, magnetic storage medium, magneto-optical storage medium, etc. Computer-readable storage medium 404 also generally refers to any portable storage medium used to hold instructions for execution by processor 402. Examples of the portable storage media would include floppy disks, CD-ROMs, DVD-ROMs, etc. Configuring computer system 400 may involve transferring instructions or code from such a portable computer readable storage medium to a fixed one that is permanently connected to processor 402.

A network interface is also depicted as providing connectivity to any type of network. Depending on the physical medium used by the network, network interface 406 incorporates appropriate circuitry such as telephony modems, DSL modems, a cable modem, an Internet transceiver, a wireless transceiver, etc. Another example of a computer-readable storage medium that stores instructions is a transmission medium, coupled either directly or indirectly to network interface 406, that is used to download instructions for execution by processor 402. An example of such a transmission medium would be a wireless medium, twisted pair lines, coaxial cables, optical fiber, etc.

It will be understood that the examples and embodiments described herein are for illustrative purposes only and that various modifications and changes in light thereof will be suggested to persons skilled in the art and are to be included within in the spirit and purview of this application and the scope of the appended claims and their equivalents. For example, the present invention is not restricted to WDM or DWDM systems but may also be applied to optical communication systems where only a single wavelength is employed for communication within a single fiber.

The invention claimed is:

1. An apparatus for monitoring performance of an optical communication link at an intermediate location along said link, said apparatus comprising:
   a coupler that taps a portion of an optical data signal traveling along said link;
   an optical amplifier that boosts said portion of said optical data signal;
   an optical receiver that recovers data based on said portion of said optical data signal;
   a tunable filter that isolates a particular wavelength component of said portion of said optical data signal for input to said optical receiver;
   an error correction decoding circuit that identifies a number of detected errors in receipt of said data; and
   a link verification stage that generates an indication of link operation based on errors identified by said error correction decoding circuit, wherein said link verification stage tunes said tunable filter to test a selected wavelength component.

2. The apparatus of claim 1, wherein said optical receiver comprises:
   a photodetector circuit that generates an electrical signal based on said portion of said optical data signal; and
   a demodulator that recovers data from said electrical signal.

3. An apparatus for monitoring performance of an optical communication link at an intermediate location along said link, said apparatus comprising:
   means for tapping a portion of an optical data signal traveling along said link;
   means for amplifying said portion of said optical data signal;
   means for recovering data based on said portion of said optical data signal;
   means for isolating a particular wavelength component of said portion of said optical data signal for input to said recovering means, wherein said means for isolating comprises a tunable filter;
   means for identifying errors in receipt of said data; and
   means for generating an indication of link operation based on a number of errors detected by said error identifying means, wherein said means for generating tunes said tunable filter to test a selected wavelength component.

4. The apparatus of claim 3, wherein said recovering means comprises:
   a photodetector circuit that generates an electrical signal based on said portion of said optical data signal; and
   a demodulator that recovers data from said electrical signal.

* * * * *